US007296987B2

(12) United States Patent
Rossi et al.

(10) Patent No.: US 7,296,987 B2
(45) Date of Patent: Nov. 20, 2007

(54) TABLET PRESS MACHINE

(75) Inventors: Sauro Rossi, Bologna (IT); Roberto Trebbi, Castenaso (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 330 days.

(21) Appl. No.: 10/546,272

(22) PCT Filed: Jan. 6, 2005

(86) PCT No.: PCT/IB2005/000024

§ 371 (c)(1), (2), (4) Date: Aug. 19, 2005

(87) PCT Pub. No.: WO2005/068170

PCT Pub. Date: Jul. 28, 2005

(65) Prior Publication Data

US 2006/0147573 A1 Jul. 6, 2006

(30) Foreign Application Priority Data

Jan. 6, 2005 (IT) .......................... BO2004A0014

(51) Int. Cl.
*B29C 43/08* (2006.01)
*B30B 11/10* (2006.01)

(52) U.S. Cl. ................... 425/121; 425/129.1; 425/345; 425/348 R

(58) Field of Classification Search .................. 425/78, 425/90, 121, 129.1, 129.2, 344–345, 348 R, 425/351

See application file for complete search history.

(56) References Cited

U.S. PATENT DOCUMENTS 2,471,139 A 5/1949 Benander et al.
4,943,227 A 7/1990 Facchini
5,685,349 A * 11/1997 Mihail et al. ............... 141/144
5,928,590 A * 7/1999 Fabbri ......................... 425/345
6,068,465 A * 5/2000 Wilson ........................ 425/193
6,866,493 B2 * 3/2005 Trebbi et al. ............... 425/345

FOREIGN PATENT DOCUMENTS

WO WO 95/20484 A1 8/1995

* cited by examiner

*Primary Examiner*—Yogendra N. Gupta
*Assistant Examiner*—Thu Khanh T. Nguyen
(74) *Attorney, Agent, or Firm*—Arent Fox LLP

(57) ABSTRACT

A tablet press (1) of the type with a rotary turret (3) for the production of tablets comprises a hopper (2) containing the pharmaceutical product in powder or granular form to be compressed; a rotary disc (4) equipped with matrices (5) designed to contain defined quantities of the pharmaceutical product fed to them by the hopper (2); reciprocating punches (8, 9) for compressing the powdered product and constituting a plurality of compressing operating stations (10); at least one set (A) f operating stations (10*a*) having a modified structure to inhibit operation, each modified structure station (10*a*) comprising barrier means (11) designed to be fitted at the matrices (5) in such a way as to prevent the passage of the product from the hopper (2) to the matrices (5), and opposing elastic means (12) designed to be coupled to, and act in conjunction with, the reciprocating punches (8, 9) and with the barrier means (11) in order to simulate the presence of powdered product.

6 Claims, 3 Drawing Sheets

TABLET PRESS MACHINE

CROSS-REFERENCE TO RELATED APPLICATION

This application is a National Stage entry of International Application Number PCT/IB2005/000024, filed Jan. 6, 2005. The disclosure of the prior application is hereby incorporated herein in its entirety by reference.

TECHNICAL FIELD

The present invention relates to a tablet press machine for the production of tablets, especially tablets used in the pharmaceutical field.

BACKGROUND ART

It is known that tablets, especially tablets for pharmaceutical use, are currently made by machines known as tablet presses which work by compressing a powdered or granular substance or product.

One prior art tablet press substantially comprises a feed hopper that contains and feeds the powdered or granular substance to a turret consisting of a first rotary disc having uniformly distributed around its edge a plurality of seats or matrices for volumetrically dosing and forming the tablets.

The tablets are formed by oppositely reciprocating punches uniformly distributed around two further discs forming part of said turret. These two further discs are located above and below the first disc and rotate continuously about the axis of the first disc and in synchrony with the latter.

The two punches in each pair—one above and one below—access a single matrix simultaneously and compress the dose of product inside the matrix with a predetermined force that gradually increases as the discs rotate and until a tablet is formed.

The tablet press therefore has a precise angular position where the powdered or granular product is loaded into the forming seats or matrices; another position where the product is compressed and yet another position, close to the first, where the formed tablets are fed out towards an outfeed chute: in practice, the tablet is formed in one complete rotation of the aforementioned discs.

The tablet presses of the type described above, usually with high-output features (hence, typically not for laboratory use) may also be used for research or experimental purposes, for example to test tablets made with a new powdered product.

To do this, a limited quantity of the powdered product to be tested is fed into the tablet press. Before this is done (since the machine has to work with a partial load), some of the operating stations of the compression turret, within a defined arc of the rotary discs, are inhibited so that they do not produce any tablets.

In other words, the pairs of punches of the seats or matrices to be inhibited are physically removed from the rotary discs, together with all the mechanical parts that allow their reciprocating motion.

In addition, the powder feed channels leading to the inhibited compression seats are sealed using suitable plugs.

With the turret set up in this way, therefore, there are operating units capable of making tablets for experimental purposes on only a limited angular sector of the machine, whilst the rest of the turret continues to rotate at the usual angular speeds but without producing any tablets since the operating elements have been removed.

This particular set-up, however, may lead to problems.

Indeed, removal and reassembly of the operating units is a slow and laborious task which, in high-output machines, is a serious drawback. Also, removing the punches from the operating stations to be inhibited creates the risk of unwanted materials such as lubricating oil or grease penetrating the stations that remain operative owing to leaks caused by imperfect seals of the elements used to plug the inhibited parts. This in turn leads to contamination which is likely to invalidate the test being carried out. Another serious problem is the uneven distribution of forces during the test because, during rotation of the turret, the punches remaining on the single operating sector of the turret exert forces that are not counterbalanced at the inhibited stations of the remaining sector from which the punches have been removed.

This may damage the active punches-and produce a test result that is ineffectual for the purposes of tablet production with the tested powder.

The present invention therefore has for an object to overcome the above mentioned disadvantages by providing a tablet press machine that can be quickly and effectively adapted to produce tablets for research and experimental purposes at only some of its operating stations, while maintaining a balanced distribution of forces at all the stations of the turret, including the inoperative stations.

DISCLOSURE OF THE INVENTION

The invention accordingly provides a tablet press machine of the type with a rotary turret for the production of tablets, comprising a hopper containing pharmaceutical product in powder or granular form to be compressed; a rotary disc equipped with matrices designed to contain defined quantities of the pharmaceutical product fed to them by the hopper; reciprocating punches for compressing the powdered product and constituting a plurality of compressing operating stations; the machine being characterised in that said plurality of stations comprises at least one set of operating stations having a modified structure to inhibit operation, each station with a modified structure comprising barrier means designed to be fitted at the matrices in such a way as to prevent the passage of the product from the hopper to the matrices, and opposing elastic means designed to be coupled to, and act in conjunction with, the reciprocating punches and with the barrier means in order to simulate the presence of the powdered product.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

DETAILED DESCRIPTION OF THE PREFERRED EMBODIMENTS OF THE INVENTION

Figure 1:
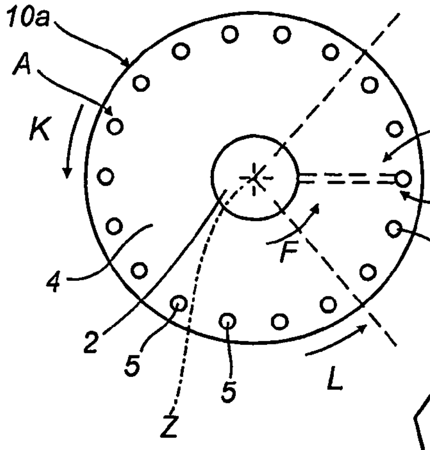
FIG. 1 is a schematic top view of a central portion of a tablet press machine.
Figure 2:
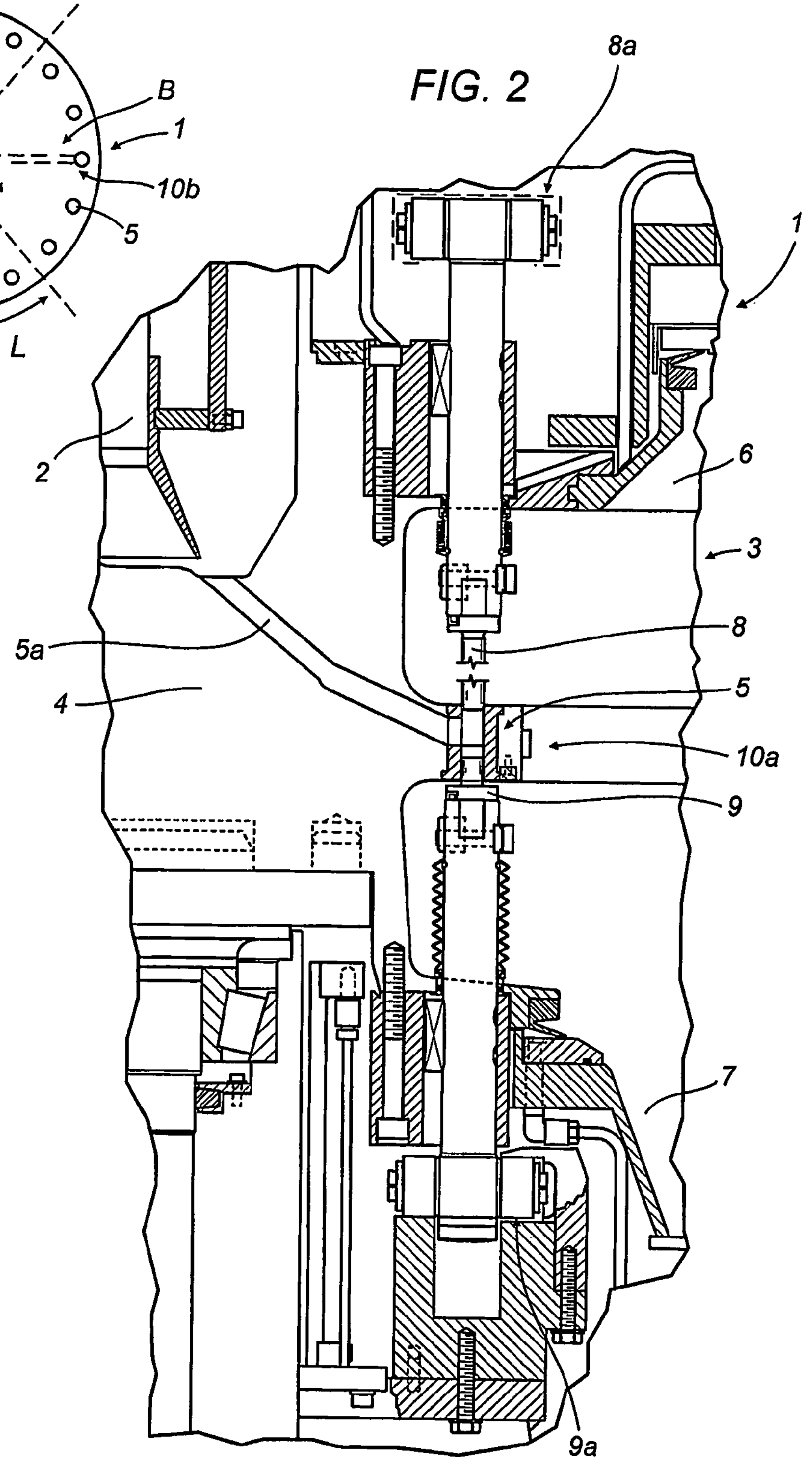
FIG. 2 is a side detail view, with some parts in cross section and others cut away for clarity, of a part of the machine illustrated in FIG. 1.

With reference to FIGS. 1 and 2, the numeral 1 denotes in its entirety a tablet press machine used for making tablets (of customary type and therefore not illustrated), especially, but not restricted to, tablets for pharmaceutical use.

The machine 1 basically comprises, a hopper 2 for feeding a powdered or granular product to a turret 3 consisting of a first disc 4 rotating about a vertical axis Z (indicated by the arrow F in FIG. 1), said disc 4 having uniformly distributed around its circumference matrices or seats 5 to which the hopper 2 feeds the product through a radial channel 5*a* which starts at the hopper 2 and opens into the seats 5 as they pass in such a way as to fill them and then level them off to the required dosage; a second and a third disc 6 and 7 located, respectively, above and below the first disc 4, rotating about said vertical axis Z, and mounting respective pluralities of upper and lower reciprocating punches 8 and 9, driven by cam means 8*a,* 9*a,* and constituting respective operating stations 10 that compress the powdered product to form individual tablets.

In order to permit experimental tests to be carried out for research purposes, that is to say, to enable the machine 1 to operate with limited quantities of powdered product, the operating stations 10 of the tablet press machine 1 according to the invention are divided into two separate sets or groups (as shown in FIG. 1). The set B of stations, labelled 10*b*, located around a first defined circular arc L have a traditional, unmodified operating structure, whilst another set A of operating stations, labelled 10*a,* located around a second circular arc K, complementary to the first arc L, are structurally adapted/modified as described in more detail below in such a way that they can be inhibited and made to operate under "no-load" conditions.

Each of the no-load stations 10*a* in the set A comprises means 11 for creating a barrier that obstructs the channel 5*a* to prevent the powdered product from reaching the seat 5; and opposing elastic means 12 coupled to and acting in conjunction with the means 11.

Figure 3:
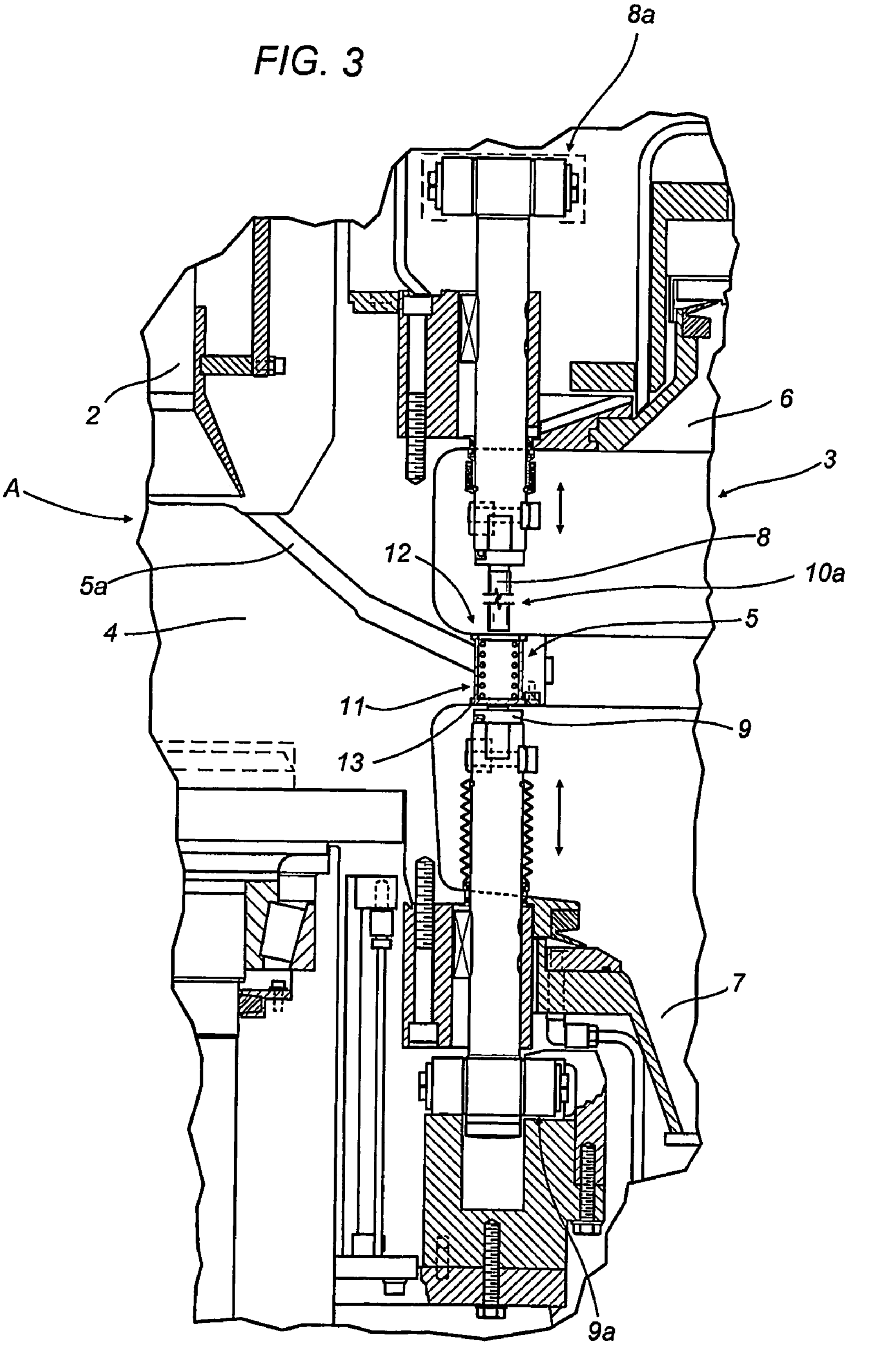
FIG. 3 illustrates a detail of the tablet press machine according to the present invention, showing an operating station in a partial side view, with some parts in cross section and others cut away in order to better illustrate some novel parts.
Figure 4:
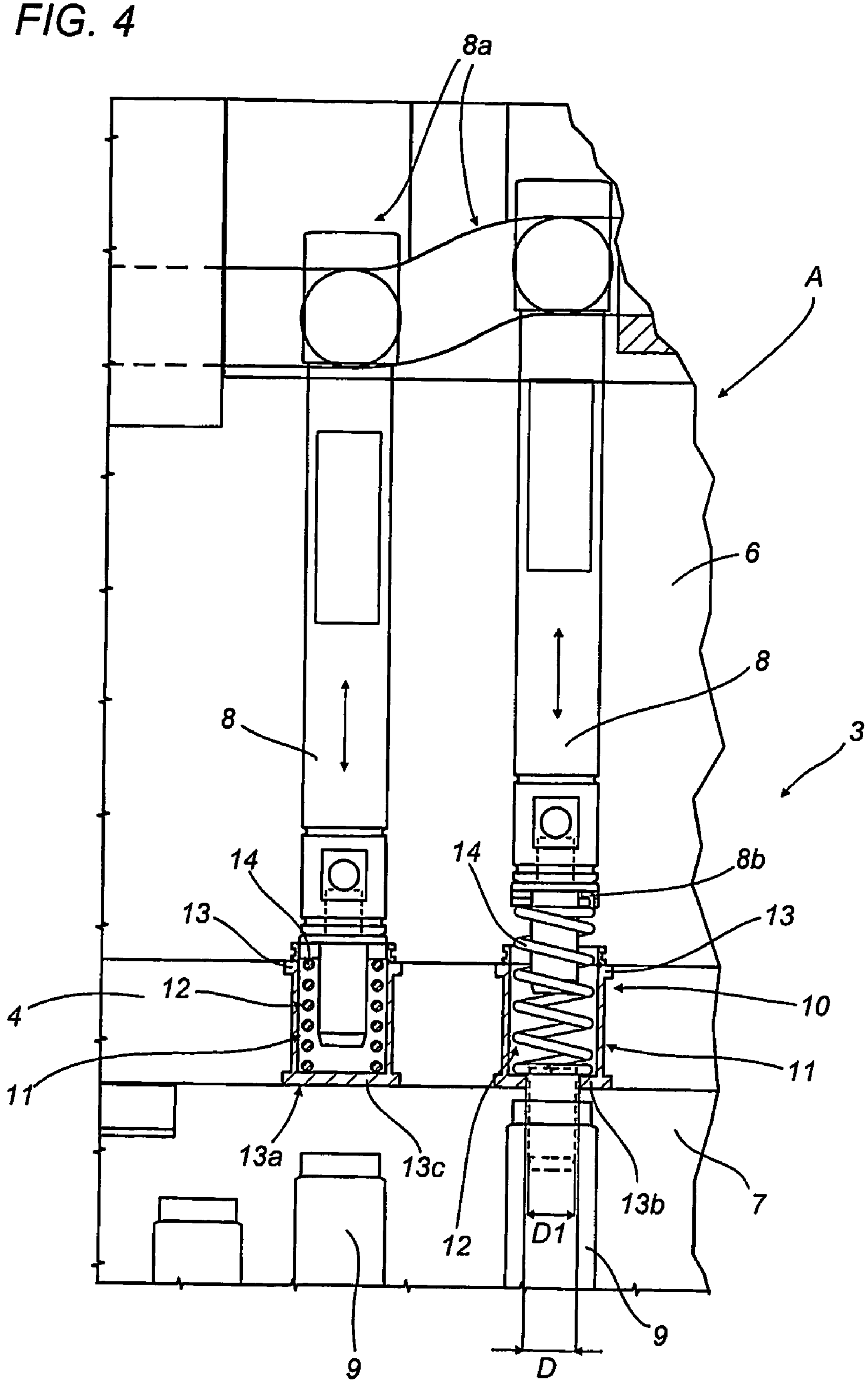
FIG. 4 is a planar development view of two operating stations of the tablet press machine of FIG. 3 in two different constructional solutions.

As better illustrated in FIGS. 3 and 4, the opposing means 12 are positioned between the means 11 and the respective punch 8, 9, which, in the non-restricting example shown in FIGS. 3 and 4, is the upper punch 8.

Again with reference to FIGS. 3 and 4, the means 11 comprise a hollow cylindrical body 13 which is fitted at the respective seat 5 on the disc 4 in the place of the seat 5 itself, and whose hollow interior houses an elastic element 14, constituting the aforementioned opposing elastic means 12, in contact, at the top, with the punch 8.

In practice, the hollow body 13 is shaped to form a "blind" seat or matrix, that is to say, a sealed seat designed to prevent the passage of the powdered product.

The element 14 is preferably a spring 14 wound around the working end of the upper punch 8 and in contact, at its other end, with the closed bottom 13*a* of the cylindrical body 13, in such a way as to simulate the opposing force which, in the operating configuration of the stations 10*b* of the set B, is normally applied to the punch 8 when the punch a is lowered and impacts the powdered product located in the seat 5. Thus, the tablet press machine 1 can operate correctly even with reduced quantities of powdered product and, in practice, as if all the stations 10 had the same structural set-up as those of set B.

In one possible solution for the modified operating stations 10*a,* the spring 14 is attached directly to the aforementioned working area of the upper punch 8 at a first collar 8*b* of the upper punch 8 itself (see operating station 10*a* on the right-hand side of FIG. 4).

In this particular solution, the upper punches 8 fitted with springs 14 can be prepared beforehand.

The lower punches 9 of all the stations 10*a* are removed.

A second possible solution is also shown in the operating station 10*a* on the right-hand side of FIG. 4.

In this specific case, the cylindrical body 13 has a second, lower collar 13*b* forming the above mentioned bottom 13*a* on which the lower end of the spring 14 rests.

More specifically, the second collar 13*b* forms a lower opening in the cylindrical body 13 with a diameter D greater than the diameter D1 of the lower punch 9 so as to avoid interference when the lower punch 9 is partly inserted into the cylindrical body 13.

Obviously, in this case, the load of the spring 14 to oppose the force applied by the upper punch 8 must, be calculated in such a way as to avoid direct contact between the two punches 8 and 9.

The operating station 10*a* on the right-hand side of FIG. 4 illustrates yet another solution for the means 11.

In this constructional solution, the cylindrical body 13 is cup-shaped and houses the spring 14 that opposes the upper punch 8, which is fitted.

The cup-shaped cylindrical body 13 therefore has a bottom surface 13*c* that is closed at a working area of the lower punch 9 which, in this case, is removed from the operating station 10*a* forming part of set A before the tablet press machine 1 is used for experimental purposes.

A tablet press machine 1 structured in this way and, in particular, adapted for use even with limited quantities of powdered product, is therefore perfectly balanced in terms of the mechanical forces involved, eliminating the risk of damage to its component parts and thus achieving the aforementioned aims.

In other words, the possibility of reconfiguring the idle stations optimises the operation of the machine 1 with reduced quantities of powdered product, making it possible to achieve a correct balance of the mechanical forces involved. Damage and wear to the mechanical parts are practically nil and there is practically no risk of undesired materials such as lubricants getting into the seats or matrices.

Furthermore, thanks to the cylindrical body and spring, it is possible to quickly and easily set the individual operating stations.

It will be understood that the tablet press described can be modified and adapted in several ways without thereby departing from the scope of the inventive concept. Moreover, all the details of the machine may be substituted by technically equivalent elements.

The invention claimed is:

1. A tablet press machine (1) of the type with a rotary turret (3) for the production of tablets, comprising a hopper (2) containing pharmaceutical product in powder or granular form to be compressed; a rotary disc (4) equipped with matrices (5) designed to contain defined quantities of the pharmaceutical product fed to them by the hopper (2); reciprocating punches (8, 9) for compressing the powdered product and constituting a plurality of compressing operating stations (10); the machine being characterised in that said-plurality of stations (10) comprises at least one set (A) of operating stations (10*a*) having a modified structure to inhibit operation, each station (10*a*) with a modified structure comprising barrier means (11) designed to be fitted at the matrices (5) in such a way as to prevent the passage of the product from the hopper (2) to the matrices (5), and opposing spring means (12) designed to be coupled to, and act in conjunction with, the reciprocating punches (8, 9) and with the barrier means (11) in order to simulate the presence of the powdered product.

2. The machine according to claim 1, characterised in that the barrier means (11) comprise a hollow cylindrical body (13) mounted at a respective matrix (5) and designed to house an elastic element (14), constituting the opposing means (12), in contact with the reciprocating punches (8, 9).

3. The machine according to claim 2, characterised in that the cylindrical body (13) has a closed bottom end (13*a*).

4. The machine according to claim 2 or 3, characterised in that the elastic element consists of a spring (14) wound around the punches (8, 9).

5. The machine according to claim 4, characterised in that the punches (8, 9) comprise a plurality of pairs of reciprocating punches (8, 9), each pair consisting of an upper punch (8) and a respective lower punch (9); the spring (14) being associated with at least one of the two punches (8, 9) in each pair.

6. The machine according to claim 5, characterised in that the spring (14) is associated with the upper punch (8).

* * * * *

UNITED STATES PATENT AND TRADEMARK OFFICE
CERTIFICATE OF CORRECTION

PATENT NO. : 7,296,987 B2
APPLICATION NO. : 10/546272
DATED : November 20, 2007
INVENTOR(S) : Sauro Rossi et al.

It is certified that error appears in the above-identified patent and that said Letters Patent is hereby corrected as shown below:

On Title Page:

Item (30), please change the Foreign Application Priority Data to read:

-- Jan. 14, 2004 (IT) .......................... BO2004A000014 --

Signed and Sealed this

Eighteenth Day of March, 2008

JON W. DUDAS
*Director of the United States Patent and Trademark Office*